United States Patent
Henderson

[11] 3,934,617
[45] Jan. 27, 1976

[54] CORRUGATED JACKETED PIPE ASSEMBLY HAVING VENTED ENCLOSURES FOR CONNECTING WELDS

[75] Inventor: James R. Henderson, Charlotte, N.C.

[73] Assignee: Controls Southeast, Inc., Charlotte, N.C.

[22] Filed: Aug. 26, 1974

[21] Appl. No.: 500,698

[52] U.S. Cl. ................. 138/114; 138/116; 138/178
[51] Int. Cl.² ............................................ F16L 9/18
[58] Field of Search ........... 138/109, 114, 111, 115, 138/116, 177, 178, 121, 123, 127, 135

[56] References Cited
UNITED STATES PATENTS
1,746,132   2/1930   Stokes................................. 138/109

*Primary Examiner*—Houston S. Bell, Jr.
*Attorney, Agent, or Firm*—Parrott, Bell, Seltzer, Park & Gibson

[57] ABSTRACT

A jacketed pipe assembly of inner and outer tubular members having respective inner and outer corrugated metal tubes arranged in spaced relationship to define therebetween a fluid-circulating chamber adapted for the circulation therethrough of a temperature controlling fluid for aiding in the flow of a processing fluid through the inner tubular member. Coupling sleeves are connected by continuous welds to opposite ends of the inner corrugated tube, and means are connected to the outer ends of the outer corrugated tube and to the respective coupling sleeves to define therebetween respective opposite ends of the fluid-circulating chamber. The continuous connecting welds are surrounded by the fluid-circulating chamber, but are isolated therefrom by being enclosed within respective enclosures which are vented exteriorly of the pipe assembly so that cross-contamination between the inner corrugated tube and the surrounding fluid-circulating chamber will be prevented in the event of rupture of the continuous welds.

21 Claims, 5 Drawing Figures

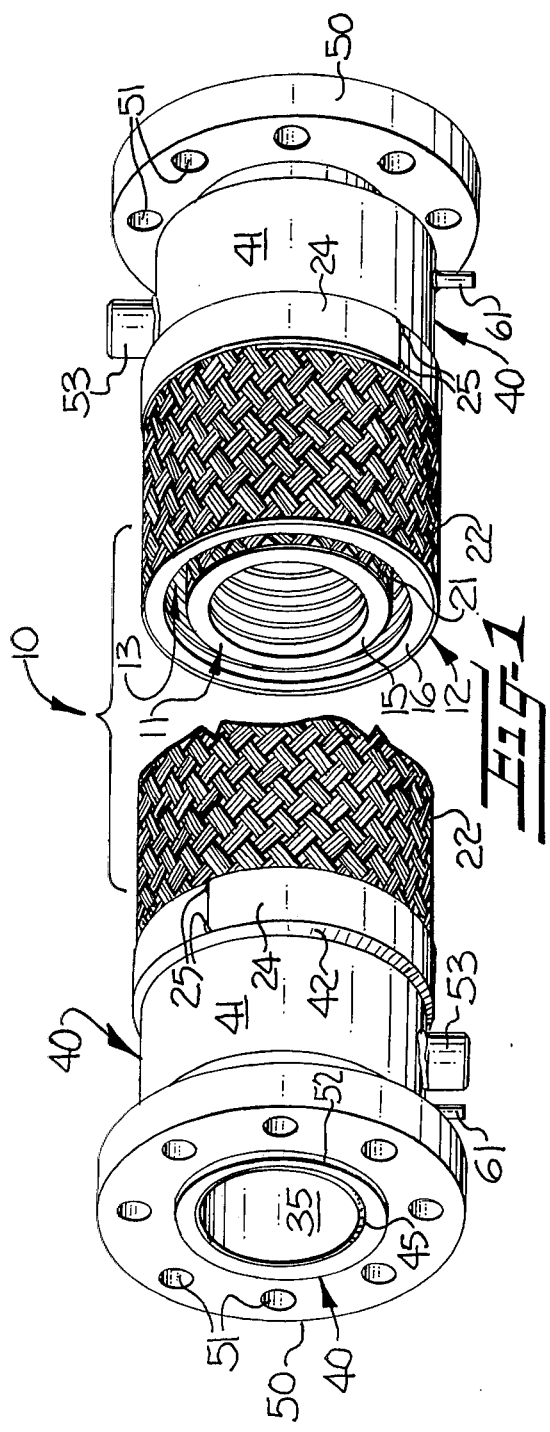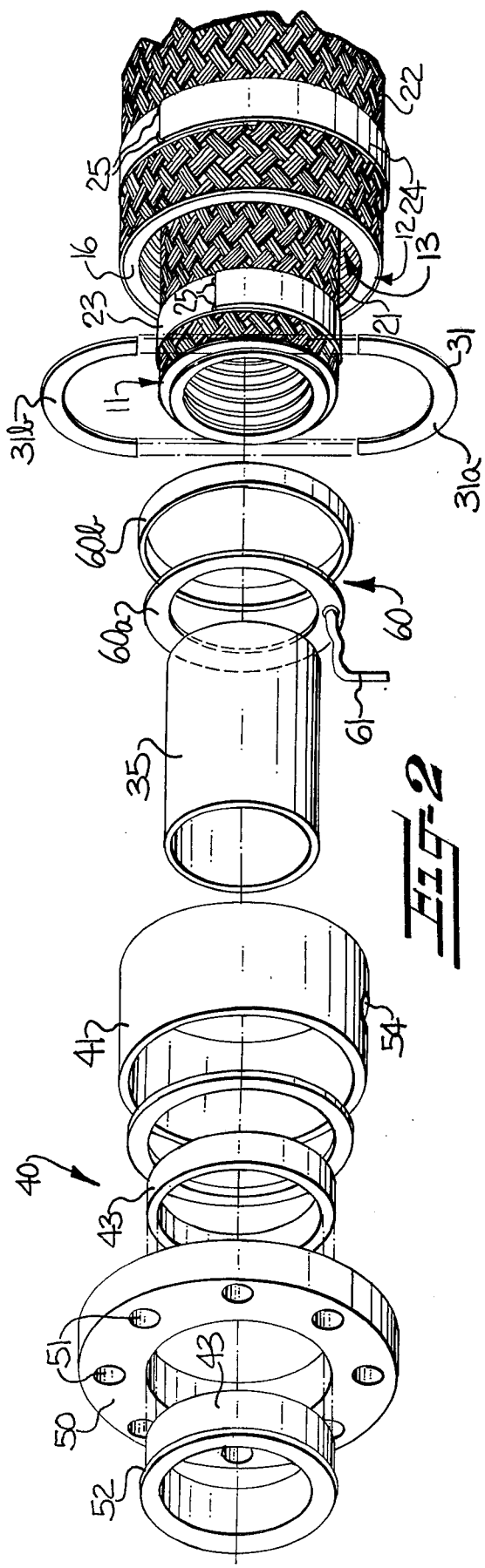

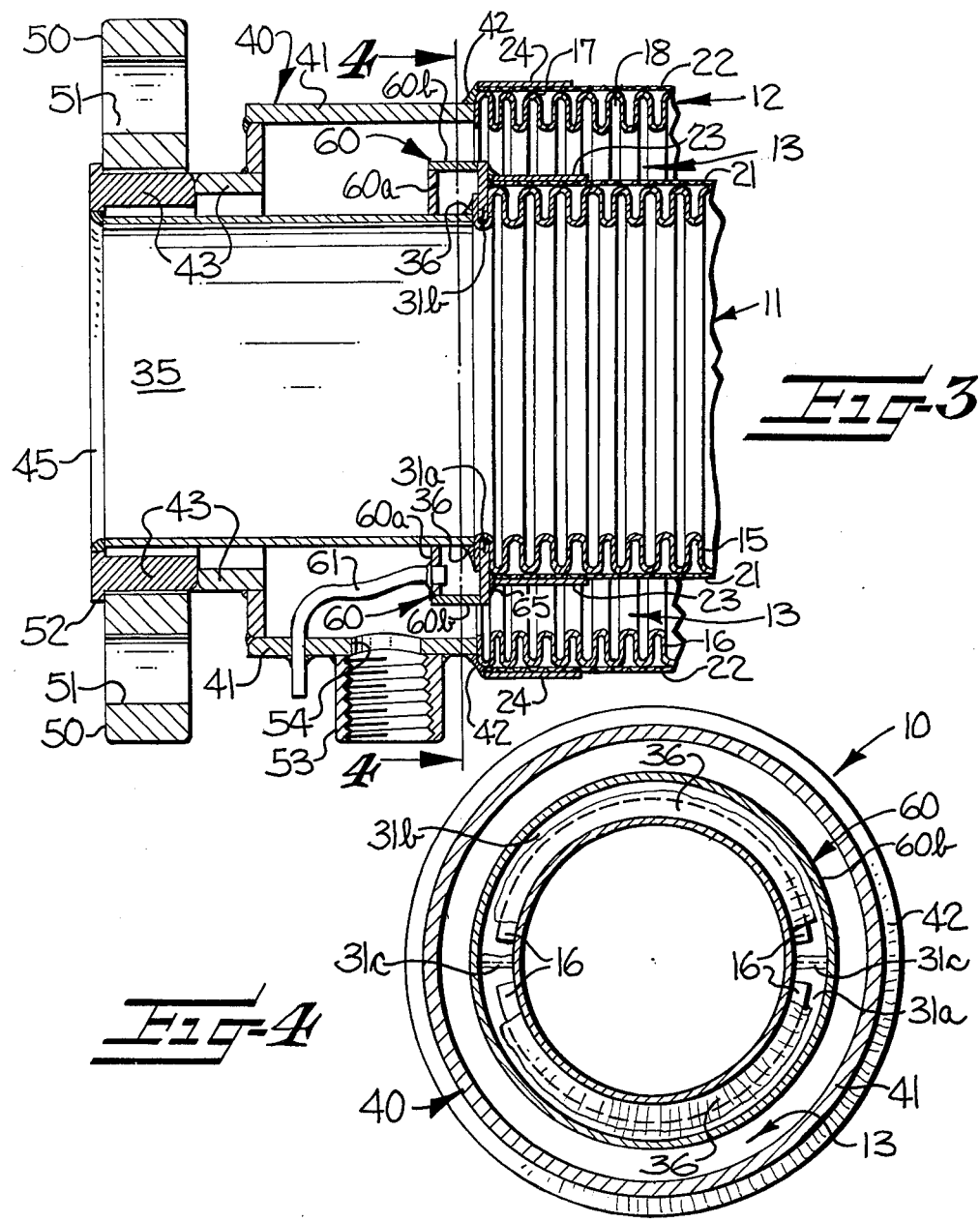
FIG-3
FIG-4
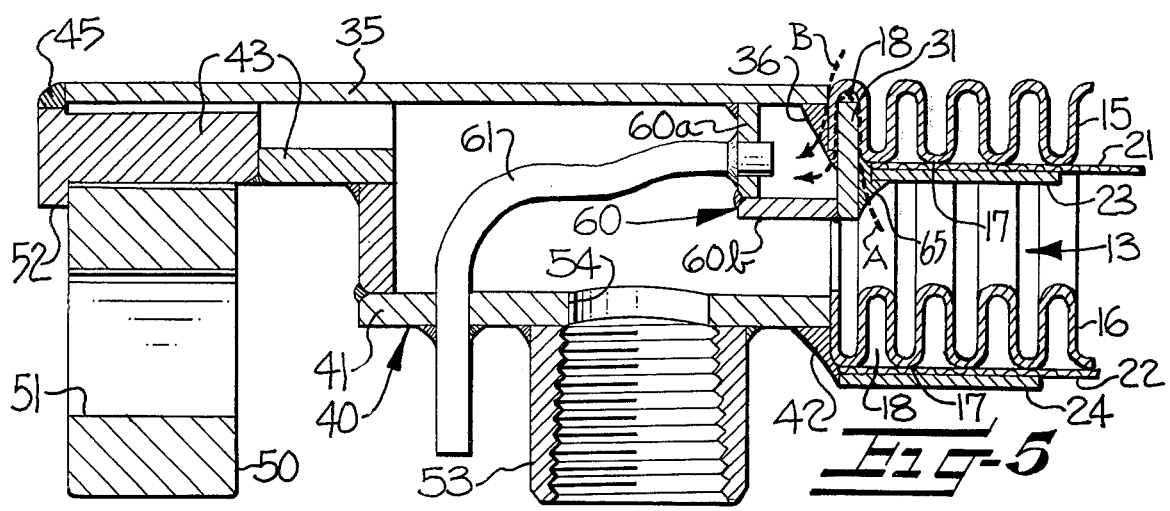
FIG-5

CORRUGATED JACKETED PIPE ASSEMBLY HAVING VENTED ENCLOSURES FOR CONNECTING WELDS

This invention relates to jacketed pipe assemblies having inner and outer tubular members composed of respective expansible and contractible corrugated metal tubes and defining therebetween a chamber adapted for the circulation therethrough of a temperature controlling fluid for aiding in the flow of a processing fluid through the inner tubular member.

In the handling of many processing materials in the fluid state, it is necessary to maintain such materials within a critical temperature range which may be cold, temperate or hot, depending upon the individual characteristics of the processing fluid. For example, in order to convey a processing fluid such as melted polyethylene, polypropylene or other melted synthetic plastic material, while maintaining the desired fluid state and flowability thereof, the tubular member or conduit through which the processing fluid is to be conveyed must be maintained at a temperature range sufficiently high to maintain the desired flowability of the processing fluid. Thus, it has been the practice for many years to utilize a jacketed pipe construction for conveying such a processing fluid with at least a substantial length of such jacketed pipe construction being in the form of longitudinally expansible and contractible inner and outer corrugated metal tubes for accommodating contraction and expansion conditions, and so that a temperature controlling fluid could be circulated through a chamber defined between the inner and outer corrugated tubes of the jacketed pipe construction to aid in the flow of the processing fluid through the inner corrugated tube.

However, difficulties having been encountered in prior art jacketed corrugated pipe constructions in that, upon rupture of the welds at opposite ends of the inner corrugated tube there was an immediate danger of cross-contamination, i.e., the fluid would either leak from the inner corrugated tube through the ruptured weld into the temperature controlling fluid-circulating chamber or it would leak from the fluid-circulating chamber through the ruptured weld into the inner corrugated tube.

It is therefore a primary object of this invention to provide a jacketed pipe assembly of inner and outer tubular members composed of respective inner and outer corrugated metal tubes and wherein at least one end of the jacketed pipe assembly includes a coupling sleeve connected by a continuous weld to the respective end of the inner corrugated tube with the continuous weld being surrounded by the fluid-circulating chamber, but isolated therefrom by being enclosed within a closed passageway vented exteriorly of the pipe assembly so that, in the event of rupture of the continuous weld and leakage therethrough, such leakage would vent to the exterior of both metal corrugated tubes to thereby prevent cross-contamination.

It is another object of this invention to provide a jacketed pipe assembly of the type described in which the outer end of the coupling sleeve is connected to the end of the outer tubular member in such a manner as to define one end of the fluid-circulating chamber therebetween so that substantially the entire length of the coupling sleeve is in heat exchanging relation to the fluid in the fluid-circulating chamber.

It is still another more specific object of this invention to provide a jacketed pipe assembly of the type described in which a coupling flange is carried by and surrounds the outer end of the fluid-circulating chamber, with the portion of the coupling sleeve underlying the flange thus being in heat exchanging relation to the fluid in the surrounding fluid-circulating chamber.

Some of the objects of the invention having been stated, other objects will appear as the description proceeds when taken in connection with the accompanying drawings, in which —

FIG. 1 is a perspective view of the improved jacketed pipe assembly with medial portions thereof broken away;

FIG. 2 is an enlarged fragmentary perspective view of the left-hand portion of FIG. 1 with many of the parts thereof being shown in exploded relationship;

FIG. 3 is an enlarged longitudinal sectional view through the left-hand end portion of the pipe assembly shown in FIG. 1;

FIG. 4 is a transverse sectional view taken substantially along line 4—4 in FIG. 3 with parts broken away to illustrate the welded together segments of an endless metal member fitting in and extending radially outwardly from the respective endmost valley of the inner corrugated tube; and FIG. 5 is an enlarged, schematic, fragmentary view of the lower portion of FIG. 3 showing the leakage paths of the fluid at one end of the jacketed pipe assembly in the event of rupture of a continuous weld at the juncture of the inner corrugated tube and a respective coupling sleeve extending axially from the end of the inner corrugated tube.

Referring more specifically to the drawings, the numeral 10 broadly designates a preferred embodiment of the jacketed pipe assembly of the present invention which comprises inner and outer tubular members 11, 12 arranged in spaced relation to each other and defining therebetween a fluid circulating chamber 13 adapted for the circulation therethrough of a temperature controlling fluid for aiding in the flow of a processing fluid through the inner tubular member 11. The inner and outer tubular members 11, 12 include respective thin-wall inner and outer elongate corrugated metal tubes 15, 16 each having annular ribs 17 and valleys 18 alternately arranged along the length thereof.

As is usual, the corrugated tubes 15, 16 are surroundingly covered by respective inner and outer braided wire sheaths 21, 22. Although only a single braided wire sheath is shown surrounding each corrugated tube 15, 16, as is well known, several such sheaths may be arranged in layered relation around either or both of the corrugated tubes 15, 16, if desired. The braided wire sheaths serve to lend stability to the corrugated tubes 15, 16 by restraining the same against excessive writhing or twisting when under high internal pressure and thereby aiding in avoiding rupture of the connecting welds at the ends of the pipe assembly, which rupture might otherwise be caused by such writhing or twisting.

Opposite ends of the inner and outer braided wire sheaths 21, 22 terminate adjacent opposite ends of the respective inner and outer corrugated tubes 15, 16, and metal anchoring bands 23, 24 encirclingly engage the terminal ends of the respective inner and outer braided wires sheaths 21, 22 for securing the same to the corrugated tubes 15, 16. Conventionally, each anchoring band 23, 24 may be in the form of a double-ended, thin strip of sheet metal with one end overlapping the other and welded thereto, as at 25 (FIGS. 1 and 2).

Referring now to FIGS. 2–5, there is shown a structure which corresponds to the left-hand end of the jacketed pipe assembly 10 shown in FIG. 1, it being understood that the structure at the right-hand end of the jacketed pipe assembly in FIG. 1 is substantially the same as that shown in FIGS. 2–5. Therefore, like parts will bear the same reference characters at both ends of the jacketed pipe assembly 10 to avoid repetitive description. Accordingly, it will be observed in FIGS. 3 and 5 that the terminal end of the metal wall of inner corrugated tube 15 faces radially outwardly, thus defining an endmost exterior valley 18 at the end of inner corrugated tube 15. As preferred, an endless metal member or ring 31 surrounds the respective end of inner corrugated tube 15 and is positioned within the endmost valley 18 thereof and extends radially outwardly therefrom a relatively short distance within fluid-circulating chamber 13, it being noted that chamber 13 extends outwardly beyond the end of inner corrugated tube 15 as will be later explained. The metal member 31 is illustrated as being of endless form in FIG. 4, but for convenience in positioning the endless metal member 31 within the endmost valley 18 of inner corrugated tube 15 as shown in FIGS. 3 and 5, the endless metal member 31 is shown as comprising a plurality of segmental plates welded together.

More specifically, the endless metal member 31 is shown as comprising a pair of substantially semicircular plates 31a, 31b (FIG. 2) which are of generally U-shaped form so as to define a substantially circular opening through the endless metal member 31 when the ends thereof are welded together as at 31c in FIG. 4. It is apparent, therefore, that the semicircular plates 31a, 31b are welded together after they are positioned in the endmost valley 18 of the inner corrugated tube 15. It should be noted that, although endless metal member 31 is shown positioned in the endmost exterior valley only of inner corrugated tube 15, it is to be understood that the radially inner portion of endless metal member 31 may be formed so as to fit in one or more additional exterior valleys 18 of inner corrugated tube 15, if desired.

Since the endless metal member 31 is positioned in the respective endmost valley 18 of inner corrugated tube 15, it cooperates with the inner corrugated tube to prevent cross-contamination between the same and the surrounding fluid-circulating chamber 13, and it also serves to reinforce and stabilize the terminal end of the thin-walled inner corrugated tube 15 while providing a firm, rigid backing for welding a metal coupling sleeve 35 to the end of inner corrugated tube 15. More particularly, it will be observed in FIGS. 3 and 5 that the inner end of coupling sleeve 35 abuts the outer end of tube 15 and serves as an extension of inner corrugated tube 15. It is apparent therefore that the inner corrugated tube 15 thus defines the end of inner tubular member 11. A continuous weld 36 encircles the inner end of coupling sleeve 35 and connects the same to the end of inner corrugated tube 15 and to endless metal member 31.

Coupling sleeve 35 is shown as being of annular cross-section, and the inner diameter thereof preferably is about the same as or slightly greater than the innermost diameter of inner corrugated tube 15. The outer diameter of at least the inner end of coupling sleeve 35 preferably is less than the outer diameter of inner corrugated tube 15 so that the terminal end of inner corrugated tube 15 extends radially outwardly beyond the abutting inner end of coupling sleeve 35 and so that the terminal end of inner corrugated tube 15 is readily connected by the continuous weld 36.

Means are provided for connecting the outer end of coupling sleeve 35 to the end of outer tubular member 12 and defining therebetween one end of the fluid-circulating chamber 13. To this end, and to accommodate the circulation of temperature controlling fluid through fluid-circulating chamber 13, it will be observed in FIGS. 3 and 5 that an outer wall means, broadly designated at 40, surrounds coupling sleeve 35 and has a substantially cylindrical inner portion or body 41 whose inner end is welded, as at 42, to the end of outer corrugated tube 16 and to the adjacent terminal ends of the outer braided wire sheath 22 and the anchoring band 24. It is apparent that the outer corrugated tube 16 thus defines the end of the outer tubular member 12. The outer wall means 40 also includes an outer end portion 43 of substantially lesser outside diameter than body 41. Such outer end portion 43 is attached to and surrounds the outer end of coupling sleeve 35.

It is important to note that, although the outer end portion 43 of outer wall means 40 is of substantially lesser diameter than the body 41 of outer wall means 40, outer wall means 40 is spaced outwardly from the coupling sleeve 35 throughout substantially the entire length of the sleeve 35 and the outer wall means 40, with the exception of the outer or terminal ends of the coupling sleeve 35 and the wall means 40 being welded together as at 45 in FIGS. 3 and 5. It can thus be seen that outer wall means 40 serves to connect coupling sleeve 35 to the end of outer tubular member 11 and to define therebetween one end of fluid-circulating chamber 13 with the end of the chamber 13 extending to the outer end of coupling sleeve 35. Thus, the temperature controlling fluid in chamber 13 is in direct heat exchanging relation with substantially the entire length of coupling sleeve 35.

The outer end portion 43 of outer wall means 40 is of lesser diameter than body 41 for accommodating thereon a coupling flange 50 loosely encircling outer end portion 43 of outer wall means 40. It is apparent, therefore, that coupling flange 50 is carried by and surrounds the reduced outer end portion 43 of outer wall means 40 with the outermost end of fluid-circulating chamber 13 underlying coupling flange 50. Thus, the portion of coupling sleeve 35 underlying flange 50 is in heat exchanging relation to the fluid in fluid-circulating chamber 13. The coupling flange 50 is provided with suitable holes 51 therethrough to facilitate bolting the same to an adjacent flange, not shown, of the fluid conveying system with which the jacketed pipe assembly 10 of the present invention is adapted to be used. The terminal end of the reduced outer end portion 43 of outer wall means 40 is provided with a radially outwardly projecting shoulder 52 serving as means for limiting axial outward movement of coupling flange 50 relative to outer wall means 40. Although outer wall means 40 is shown as being of built-up welded construction, it is apparent that outer wall means 40 may be of one-piece construction, if desired.

In order to circulate a suitable temperature controlling fluid into, through and out of the fluid-circulating chamber 13 defined between corrugated tubes 15, 16 and between the respective opposite end portions of coupling sleeves 35 and the surrounding outer wall means 40 at opposite ends of the jacketed pipe assembly 10, body 41 of each outer wall means 40 has a substantially radially outwardly projecting tubular nipple 53 suitably secured thereto, as by welding. Each nipple 53 communicates with fluid-circulating chamber 13 through a suitable opening 54 in body 41 of the respective outer wall means 40. The nipples 53 are adapted for the connection of suitable conduits or pipes thereto, not shown, for circulating the temperature controlling fluid into, through and out of chamber 13. Nipples 53 may be internally or externally threaded, as desired, and are shown threaded interiorly by way of illustration only.

The relative locations of nipples 53 in FIG. 1 may be suited to a customer's requirements. However, if the jacketed pipe assembly 10 is to occupy a substantially horizontal position, it is generally preferred that the nipple 53 serving as the inlet for the temperature controlling fluid is positioned on the upper portion of the respective outer wall means 40 and that the other nipple 53, serving as the outlet, be positioned on the lower portion of the respective outer wall means 40 as illustrated in the respective right-hand and left-hand portions of FIG. 4. Thus, condensate incidental to circulating steam from right to left through chamber 13, for example, would readily gravitate out of chamber 13.

Now, even though a welder may provide a high quality continuous weld 36 connecting together adjacent portions of inner corrugated tube 15, endless metal member 31 and coupling sleeve 35, with the quality of such weld 36 exceeding substantially the requirements for withstanding pressure as established by standards of the industry, there are instances in which the molecular structure of the continuous weld 36 may break down and result in rupture thereof, especially after extensive use of the jacketed pipe assembly 10 under conditions causing substantial vibration thereof. The possibility of such rupture of the continuous weld 36 is reduced considerably because of the reinforcement provided by endless metal member 31 for that portion of the end of the thin-walled inner corrugated tube 15 against which the weld 36 is formed. However, in the event of the occurrence of rupture of weld 36, such as to permit leakage through weld 36 from within either the inner corrugated tube 15 or the surrounding temperature controlling fluid-circulating chamber 13, or both, such leakage will be vented into a closed passageway 60 and along a conduit means 61 to the exterior of both corrugated tubes 15, 16 and, thus, exteriorly of the jacketed pipe assembly 10.

The closed passageway 60 is formed of a radial annular wall means 60a and a short cylindrical annular wall means 60b surrounding the continuous weld 36 and cooperating with the end of tube 15 and endless metal member 31 to define closed passageway 60 so that it encloses continuous weld 36 therein. Thus, even though the main continuous connecting weld 36 is surrounded by fluid-circulating chamber 13, weld 36 is entirely isolated or shielded from the fluid in chamber 13 by the enclosure defining the respective passageway 60. The conduit means 61, serving as a vent means, communicatively connects the closed passageway 60 exteriorly of pipe assembly 10 by extending from the radial wall means 60a and, for example, through the body or cylindrical wall 41 of outer wall means 40 defining the end of fluid-circulating chamber 13. It will also be noted that the short cylindrical wall means 60b defining passageway 60 is welded or otherwise suitably secured to the radially outer portion of endless metal member 31, which radially outer portion also is spaced inwardly of the inner surfaces of outer corrugated tube 16 and body 41 of wall means 40 to permit passage thereby of the temperature controlling fluid.

In order to firmly bond the adjacent outer ends of inner braided wire sheath 21 and the respective metal anchoring band 23 to the inside surface of endless metal member 31, it will be observed in FIG. 5 that the proximal outer ends of inner braided wire sheath 21 and metal anchoring band 23 are spaced from endless metal member 31 to provide a gap therebetween for facilitating welding of braided wire sheath 21 and anchoring band 23 together as well as welding the same to endless metal member 31. The weld connecting sheath 21, anchoring band 23 and endless metal member 31 together may be termed as a sheath bonding weld and is indicated at 65 in FIGS. 3 and 5.

As shown in FIG. 5, the sheath bonding weld 65 preferably encircles the outer end of the respective anchoring band 23 and also extends between endless metal member 31 and the adjacent ends of sheath 21 and anchoring band 23. Weld 65 may be formed either before or after the main continuous weld 36. It is apparent however that, in order for the proximal surfaces of anchoring band 23 and endless metal member 31 to be readily accessible to a welder for forming the sheath bonding weld 65, both of the welds 36, 65, as well as the surrounding wall means 60a, 60b defining passageway 60, should be formed before outer wall means 40 is formed around coupling sleeve 35.

Although it is preferred that weld 65 is continuous, it is not essential that it be continuous since fluid will not leak to the exterior of corrugated tubes 15, 16 from fluid-circulating chamber 13 along the endmost valley 18, as represented by the path A in FIG. 5, unless the main continuous weld 36 is ruptured as heretofore described. Of course, in the event of rupture of continuous weld 36, any leakage from within inner corrugated tube 15 would flow essentially along the broken-line path B in FIG. 5 through the then ruptured weld 36 and thus be vented to the exterior of both corrugated tubes 15, 16 through conduit means 61.

It can thus be seen that, assuming that the sheath bonding weld 65 at each end of pipe assembly 10 is continuous as well as the respective weld 36, in the event of rupture of either or both main welds 36 at opposite ends of the pipe assembly along with the respective sheath bonding welds 65, leakage of the processing fluid through either ruptured weld 36 from within the inner corrugated tube 15 and/or leakage of the temperature controlling fluid through either pair of ruptured welds 65, 36 from within fluid-circulating chamber 13 will be vented to the exterior of both corrugated tubes 15, 16 and will prevent cross-contamination between inner corrugated tube 15 and fluid-circulating chamber 13. Also, upon rupture of either or both of the exterior welds 42 at opposite ends of jacketed pipe assembly 10, it is apparent that leakage therethrough of temperature controlling fluid from chamber 13 also would be vented to the exterior of both tubes 15, 16. Of course, if weld 65 is continuous and is not ruptured, and the exterior weld 42 also is continuous and is not ruptured, the temperature controlling fluid would not escape from fluid-circulating chamber 13 even if the weld 36 were then in a ruptured state. In any event, leakage of fluid through any of the welds 36, 42, 65 would be readily detected by an attendant, since the temperature controlling fluid would escape through the corresponding conduit 61 or through the corresponding weld 42 and, thus, corrective measures could be taken before the leakage created a more serious problem.

From the foregoing description it can thus be seen that there is provided an improved jacketed pipe assembly of inner and outer tubular members composed of respective inner and outer elongate corrugated metal tubes having a fluid-circulating chamber therebetween and wherein each end of the jacketed pipe assembly includes a coupling sleeve connected by a continuous weld to the respective end of the inner corrugated tube with each continuous weld being isolated from the surrounding fluid-circulating chamber by being surrounded and enclosed within a closed passageway that is vented exteriorly of the pipe assembly so that, in the event of rupture of either such continuous weld and consequent leakage therethrough, such leakage would vent to the exterior of both metal corrugated tubes to thereby prevent cross-contamination.

As described herein, both ends of the jacketed pipe assembly 10 are of substantially the same construction. It is contemplated however, that one end of the jacketed pipe assembly may be constructed in the manner described herein, with the other end being of different construction without departing from the invention; e.g., the other end of the jacketed pipe assembly may be constructed in accordance with my invention as disclosed in a copending patent application filed concurrently herewith and entitled JACKETED PIPE ASSEMBLY FORMED OF CORRUGATED METAL TUBES.

In the drawings and specification there has been set forth a preferred embodiment of the invention and, although specific terms are employed, they are used in a generic and descriptive sense only and not for purposes of limitation.

That which is claimed is:

1. A jacketed pipe assembly constructed to avoid cross-contamination and comprising inner and outer tubular members arranged in spaced relation to each other and defining therebetween a fluid-circulating chamber adapted for the circulation therethrough of a temperature controlling fluid for aiding in the flow of a processing fluid through said inner tubular member, said inner and outer tubular members including respective inner and outer elongate corrugated metal tubes, a metal coupling sleeve serving as an extension of said inner corrugated tube and having its inner end abutting one end of said inner corrugated tube, a continuous weld encircling the inner end of said coupling sleeve and connecting the same to the end of said inner corrugated tube, means connecting said coupling sleeve to the end of said outer tubular member and defining therebetween one end of said fluid-encirculating chamber, means within said fluid-circulating chamber surrounding said continuous weld and defining a closed passageway enclosing said continuous weld therein, and vent means communicatively connecting said closed passageway exteriorly of the pipe assembly whereby, in the event of rupture of the continuous weld, leakage into the closed passageway from within said inner corrugated tube will be vented to the exterior of both tubular members and thereby prevent cross-contamination.

2. A jacketed pipe assembly constructed to avoid cross-contamination and comprising inner and outer tubular members arranged in spaced relation to each other and defining therebetween a fluid-circulating chamber adapted for the circulation therethrough of a temperature controlling fluid for aiding in the flow of a processing fluid through said inner tubular member, said inner and outer tubular members including respective inner and outer elongate corrugated metal tubes each having annular ribs and valleys alternately arranged along the length thereof, an endless metal member surrounding one end of said inner corrugated tube and being positioned within the endmost valley thereof and extending radially outwardly therefrom a relatively short distance within the fluid-circulating chamber, a metal coupling sleeve serving as an extension of said inner corrugated tube and having its inner end abutting said one end of said inner corrugated tube, a continuous weld encircling the inner end of said coupling sleeve and connecting the same to the end of said inner corrugated tube and to said endless metal member, means connecting said coupling sleeve to the end of said outer tubular member and defining therebetween one end of said fluid-circulating chamber, means within said fluid-circulating chamber surrounding said continuous weld and defining a closed passageway enclosing said continuous weld therein, and vent means communicatively connecting said closed passageway exteriorly of the pipe assembly whereby in the event of rupture of the continuous weld, leakage therethrough from within said inner corrugated tube or from said surrounding fluid-circulating chamber will be vented to the exterior of both tubular members and thereby prevent cross-contamination.

3. A structure according to claim 2 wherein said means connecting said coupling sleeve to the end of said outer tubular member and defining therebetween one end of said fluid-circulating chamber is connected to the outer end of said coupling sleeve and defines an end of the fluid-circulating chamber which extends to the outer end of said coupling sleeve.

4. A structure according to claim 2 wherein said means connecting said coupling sleeve to the end of said outer tubular member and defining therebetween one end of said fluid-circulating chamber is connected to the outer end of said coupling sleeve and defines an end of the fluid-circulating chamber which extends to the other end of said coupling sleeve, and wherein a coupling flange is carried by and surrounds the outer end of said least recited means whereby the outermost end of said fluid-circulating chamber underlies said coupling flange.

5. A structure according to claim 4 wherein said means connecting said coupling sleeve to the end of said outer tubular member and defining therebetween one end of said fluid-circulating chamber comprises means for limiting axial outward movement of said coupling flange carried thereby.

6. A structure according to claim 2 wherein said means connecting said coupling sleeve to the end of said outer tubular member and defining therebetween one end of said fluid-circulating chamber is connected to the outer end of said coupling sleeve and defines an end of the fluid-circulating chamber which extends to the outer end of said coupling sleeve, and wherein said last recited means has a reduced outer end portion, and wherein a coupling flange is carried by and surrounds said reduced outer end portion whereby the outermost end of said fluid-circulating chamber underlies said reduced end portion and said coupling flange carried thereby.

7. A structure according to claim 2 wherein the end of said inner corrugated tube extends radially outwardly beyond the inner end of said coupling sleeve abutting the same so as to be readily connected by said continuous weld.

8. A structure according to claim 2 wherein said endless metal member surrounding said one end of said inner corrugated tube comprises a plurality of segmental plates welded together.

9. A structure according to claim 2 wherein said endless metal member positioned within the endmost valley of said inner corrugated tube is of substantially annular form and comprises a pair of substantially semicircular plates welded together.

10. A structure according to claim 2 wherein said means within said fluid-circulating chamber defining a closed passageway enclosing said continuous weld therein comprises annular wall means encircling said inner end of said coupling sleeve and cooperating with said endless metal member to form said closed passageway, and said vent means comprising a conduit connected to said annular wall means and communicatively connecting said passageway therein exteriorly of the pipe assembly.

11. A structure according to claim 2 including a braided wire sheath surroundingly covering said inner corrugated tube and terminating adjacent said endless metal member, and a metal anchoring band encircling the terminal end of said braided wire sheath and being welded to said endless metal member.

12. A structure according to claim 2 including a braided wire sheath surroundingly covering said inner corrugated tube and terminating adjacent said endless metal member, a metal anchoring band encircling the terminal end of said braided wire sheath and being welded to said endless metal member and to said braided wire sheath, and said metal anchoring band being spaced from said endless metal member to provide a gap therebetween for facilitating welding of said braided wire sheath to said anchoring band and said endless metal member.

13. A structure according to claim 2 wherein the ends of said inner and outer tubular members are defined by the respective inner and outer corrugated tubes, said means connecting said coupling sleeve to the end of said outer tubular member including an outer wall means surrounding said sleeve and having its inner end welded to the end of said outer corrugated tube, inner and outer braided wire sheaths surroundingly covering the respective inner and outer corrugated tubes and terminating adjacent said endless metal member and said outer wall means, respectively, and metal anchoring bands encirclingly engaging the terminal ends of the respective inner and outer braided wire sheaths and being welded to said endless metal member and said outer wall means, respectively.

14. A structure according to claim 2 including a nipple secured to and projecting radially outwardly from said means connecting said coupling sleeve to said outer tubular member and defining one end of said fluid-circulating chamber, and said nipple communicating with said chamber for the flow of fluid therethrough.

15. A jacketed pipe assembly constructed to avoid cross-contamination and comprising inner and outer tubular members arranged in spaced relation to each other and defining therebetween a fluid-circulating chamber adapted for the circulation therethrough of a temperature controlling fluid for aiding in the flow of a processing fluid through said inner tubular member, said inner and outer tubular members including respective inner and outer elongate corrugated metal tubes, a metal coupling sleeve serving as an extension of said inner corrugated tube at each end thereof, each coupling sleeve having its inner end abutting the respective end of said inner corrugated tube, a continuous weld encircling the inner end of each coupling sleeve and connecting the same to the respective end of said inner corrugated tube, means connecting each coupling sleeve to the respective end of said outer tubular member and defining therebetween a respective end of said fluid-circulating chamber, means within said fluid-circulating chamber surrounding each continuous weld and defining a closed passageway enclosing the respective continuous weld therein, and vent means communicatively connecting each closed passageway exteriorly of the pipe assembly whereby, in the event of rupture of either continuous weld, leakage into the respective closed passageway from within said inner corrugated tube will be vented to the exterior of both tubular members and thereby prevent cross-contamination.

16. A jacketed pipe assembly constructed to avoid cross-contamination and comprising inner and outer tubular members arranged in spaced relation to each other and defining therebetween a fluid-circulating chamber adapted for the circulation therethrough of a temperature controlling fluid for aiding in the flow of a processing fluid through said inner tubular member, said inner and outer tubular members including respective inner and outer elongate corrugated metal tubes each having annular ribs and valleys alternately arranged along the length thereof, an endless metal member surrounding each end of said inner corrugated tube and being positioned within the respective endmost valley thereof and extending radially outwardly therefrom a relatively short distance within the fluid-circulating chamber, a metal coupling sleeve serving as an extension of said inner corrugated tube at each end thereof, each coupling sleeve having its inner end abutting the respective end of said inner corrugated tube, a continuous weld encircling the inner end of each coupling sleeve and connecting the same to the respective end of said inner corrugated tube and to the respective endless metal member, means connecting each coupling sleeve to the respective end of said outer tubular member and defining therebetween a respective end of said fluid-circulating chamber, means within said fluid-circulating chamber surrounding each continuous weld and defining a closed passageway enclosing the respective continuous weld therein, and vent means communicatively connecting each closed passageway exteriorly of the pipe assembly whereby in the event of rupture of either continuous weld, leakage therethrough from within said inner corrugated tube or from said surrounding fluid-circulating chamber will be vented to the exterior of both tubular members and thereby prevent cross-contamination.

17. A structure according to claim 16 wherein each of said means connecting each coupling sleeve to the end of said outer tubular member and defining therebetween a respective end of said fluid-circulating chamber is connected to the outer end of said coupling sleeve and defines an end of the fluid-circulating chamber which extends to the outer end of the coupling sleeve.

18. A structure according to claim 16 wherein each of said means connecting each coupling sleeve to the end of said outer tubular member and defining therebetween a respective end of said fluid-circulating chamber is connected to the outer end of said coupling sleeve and defines an end of the fluid-circulating chamber which extends to the outer end of the coupling sleeve, and wherein a coupling flange is carried by and surrounds the outer end of said last recited means whereby the outermost end of said fluid-circulating chamber underlies said coupling flange.

19. A structure according to claim 18 wherein each of said means connecting each coupling sleeve to the end of said outer tubular members and defining therebetween a respective end of said fluid-circulating chamber comprises means for limiting axial movement of the respective coupling flange carried thereby.

20. A structure according to claim 16 wherein said means connecting each coupling sleeve to the other end of said outer tubular member and defining therebetween one end of said fluid-circulating chamber is connected to the outer end of said coupling sleeve and defines an end of the fluid-circulating chamber which extends to the outer end of said coupling sleeve, and wherein said last recited means has a reduced outer end portion, and wherein a coupling flange is carried by and surrounds said reduced outer end portion whereby the outermost end of said fluid-circulating chamber underlies said reduced end portion and said coupling flange carried thereby.

21. A structure according to claim 16 including nipples secured to and projecting radially outwardly from said means connecting said coupling sleeves, to said outer tubular member and defining the ends of said fluid-circulating chamber, and said nipples communicating with said chamber for circulation of fluid into, through and out of said chamber.

* * * * *